United States Patent [19]

Culler

[11] Patent Number: 5,750,242

[45] Date of Patent: May 12, 1998

[54] INFRA-RED REFLECTIVE COVERINGS

[75] Inventor: Gregory D. Culler, Nottingham, Pa.

[73] Assignee: W. L. Gore & Associates, Inc., Newark, Del.

[21] Appl. No.: 723,369

[22] Filed: Sep. 30, 1996

Related U.S. Application Data

[63] Continuation of Ser. No. 419,777, Apr. 11, 1995, abandoned.

[51] Int. Cl.[6] ............................................. B32B 3/00
[52] U.S. Cl. .................. 428/209; 428/306.6; 428/308.4; 428/311.7; 428/315.7; 428/422; 428/457; 428/311.1
[58] Field of Search ........................ 428/195, 209, 428/212, 215, 36.1, 457, 224, 246, 260, 306.6, 308.4, 422, 461, 311.1, 311.7, 315.7; 383/107

[56] References Cited

U.S. PATENT DOCUMENTS

| | | | |
|---|---|---|---|
| 4,064,305 | 12/1977 | Wallin . | |
| 4,308,882 | 1/1982 | Pusch et al. . | |
| 4,467,005 | 8/1984 | Pusch et al. . | |
| 4,495,239 | 1/1985 | Pusch et al. . | |
| 4,508,776 | 4/1985 | Smith | 428/248 |
| 4,529,633 | 7/1985 | Karlsson . | |
| 4,533,591 | 8/1985 | Sorko-Ram . | |
| 4,557,957 | 12/1985 | Manniso | 428/36 |
| 4,621,012 | 11/1986 | Pusch . | |
| 4,659,602 | 4/1987 | Birch . | |
| 5,209,965 | 5/1993 | Caldwell | 428/252 |
| 5,230,430 | 7/1993 | Kidder | 383/107 |
| 5,281,460 | 1/1994 | Cox . | |

FOREIGN PATENT DOCUMENTS

| | | |
|---|---|---|
| 0361865 | 4/1990 | European Pat. Off. . |
| 2612948 | 9/1988 | France . |
| WO 8805385 | 7/1988 | WIPO . |

*Primary Examiner*—Elizabeth Evans
*Attorney, Agent, or Firm*—Gary A. Samuels

[57] ABSTRACT

A textile material is described which provides thermal image masking or suppression in the mid and far infra-red region without compromising the effectiveness of visual and near IR camouflage or comfort level, or the effectiveness, and mobility of a person. This is achieved by incorporating a metallized microporous membrane into a typical article of clothing or covering, e.g. tents, which suppresses thermal imaging. Specifically an air permeable, moisture vapor transmissive, waterproof, heat reflecting material of at least one metallized microporous membrane is laminated to at least one other layer or textile backing material such as woven, nonwoven or knitted nylon, polyester, cotton, silk, etc. or additional microporous layers, in which the metal in the metallized membrane forms a discontinuous layer an the surface and on the pore walls adjacent the surface of the microporous membrane.

7 Claims, 1 Drawing Sheet

5,750,242

INFRA-RED REFLECTIVE COVERINGS

This application is a continuation of application Ser. No. 08/419,777, filed Apr. 11, 1995 now abandoned.

FIELD OF THE INVENTION

This invention relates to electromagnetic reflective and transmissive materials and to the use of the materials as electromagnetic camouflage, particularly at infra-red wavelengths.

BACKGROUND OF THE INVENTION

Instruments which detect thermal radiation are well known. Radiation from the human body or other objects can easily be detected by infra-red detecting instruments.

These instruments operate in the atmospheric transparency windows of 3 to 5 micrometers and 8 to 12 micrometers. Infra-red imaging at wavelengths outside of these windows is not practical due to atmospheric absorption. In images obtained with these devices, objects with high emissivities and or objects having a higher temperature relative to the background appear as bright silhouettes. This is due to the emitted power of these objects. The emitted power is described by the equation:

$$W = \epsilon \sigma T^4$$

where W=emitted power in BTU/hr.-ft.$^2$, $\epsilon$=emissivity, $\sigma$=the Stephan-Boltzman constant, and T=temperature in degrees Rankine.

From this equation it can be seen that there are two possible approaches to subdue a thermal image; use low emissivity materials on the exterior surface or reduce the exterior surface temperature. The typical approach is to use low emissivity materials on the exterior surface and then cover the low emissivity surface with materials which are transparent in infrared (IR) wavelengths but optically opaque to provide visual camouflage. The second approach is to use thermal insulation to reduce the exterior surface temperature. A third approach is a combination of these methods.

It has long been a desirable goal to develop materials that protect persons or equipment from detection by electromagnetic, and especially infrared, detecting equipment without detracting from the mobility of the personnel or equipment.

For example, U.S. Pat. No. 5,281,460 provides a pattern of strips attached to a porous nylon mesh. The strips are coated with silver, copper or pigment.

U.S. Pat. No. 4,495,239 employs a base layer of textile fabric having a vapor deposited metallic reflecting layer on it, followed by a camouflage paint.

U.S. Pat. No. 4,659,602 employs a woven material that has a metal foil on it and a polyethylene sheet containing a conductive particulate.

In U.S. Pat. No. 4,621,012 a textile is coated with a thermoplastic that has selected dipole material in it, and which has a metallic layer to reflect infra-red.

U.S. Pat. No. 4,467,005 employs a support netting that a carrier web on each side having an IR reflecting metal coating. The material is water vapor permeable.

U.S. Pat. No. 4,533,591 provides a thermoplastic resin having discrete electromagnetically particles dispersed in it.

U.S. Pat. No. 4,064,305 provides a knit formed of strands of noncontinuous polymeric fibers and noncontinuous metal fibers which reflect radar waves.

U.S. Pat. No. 4,529,633 teaches an electromagnetic reflecting material made of a layer of polyethylene, a layer of a metal coating, an adhesive and a fabric.

Because of the presence of plastic layers, the compositions of the patents do not allow water vapor to escape easily, and when worn as garments are uncomfortable or when draped over equipment cause "sweating"of the equipment.

An exception is U.S. Pat. No. 4,467,005 which claims water-vapor permeability, but not air permeability. To a person skilled in the art it would be readily apparent that the technique described to achieve water vapor permeability and waterproofness would not result in a sufficiently high water vapor permeability to be of any practical value. Any improvements in water vapor permeability would result in a corresponding reduction in waterproofness. The materials described in the aforementioned patent provide a satisfactory surface for metallization and are acceptable for uses where a high degree of flexibility and mobility are not required, such as a covering for stationary objects, but many disadvantages surface when these materials are used to provide thermal imaging protection for an individual person. Chief among these disadvantages are the lack of drape, low moisture vapor permeability, and weight. In addition to the aforementioned disadvantages, the metallized surface is on the exterior of the laminates where it is in a position to be damaged or scraped off while moving through brush. It is desirable from a physiological standpoint to reduce the heat stress of the person wearing IR camouflage garments to the largest extent possible. This can be accomplished by increasing the evaporative cooling of the body by allowing moisture vapor to easily permeate through the laminate, and by reducing weight and thickness of the total thermal camouflage package.

SUMMARY OF THE INVENTION

The object of this invention is to provide thermal image masking or suppression in the mid and far infra-red region without compromising the effectiveness of visual and near IR camouflage or comfort level, or the effectiveness, and mobility of a person. This objective is achieved by incorporating a metallized microporous membrane into a typical article of clothing or covering, such as tenting, which suppresses thermal imaging of objects underneath or behind the metallized membrane.

Specifically the invention is directed to an air permeable, moisture vapor transmissive, waterproof, drapable heat reflecting material consisting essentially of at least one metallized microporous membrane laminated to at least one other layer or textile backing material such as woven, nonwoven or knitted polyamides, polyolefins, polyester, cotton, silk, etc. or additional microporous layers, in which the metal in the metallized membrane forms a discontinuous layer on the surface and on the pore walls adjacent the surface of the microporous membrane.

DETAILED DESCRIPTION OF THE INVENTION

Figure 1A:
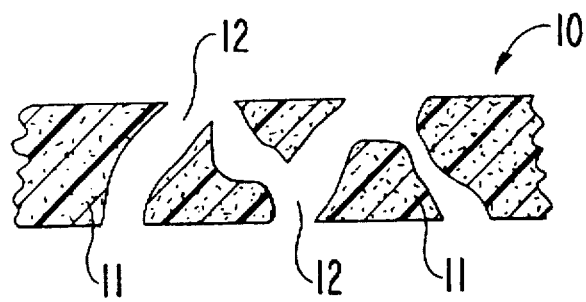
FIG. 1a and 1b are cutaway side views of microporous membrane used in the invention which depicts how the metal layer can be discontinuous but still provide an effective barrier to heat transmission.
Figure 1B:
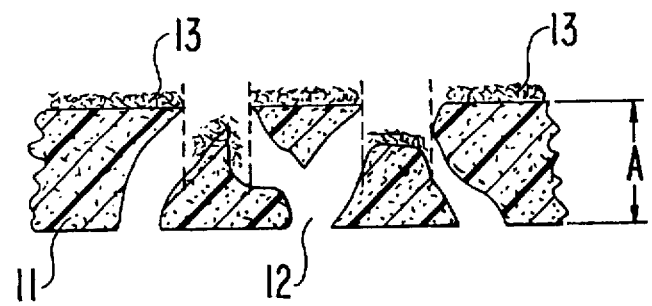

Referring to FIG. 1a, an enlarged side cutaway view of a microporous membrane 10 is shown with polymer sheet 11 having irregularly shaped pores 12 running through it from side to side. In FIG. 1b a vapor deposited metal 13 is shown in which the metal is deposited from above the membrane so that the metal coats the surface and the "open" pore walls, i.e., that portion of the pore walls that are open as viewed from above the membrane. Thus looking vertically down from the top in the direction of the arrow it appears that the metal has formed continuous line-of-sight coverage. This is depicted by the dotted lines in FIG. 1b. But from the side, it is seen that the metal coating is discontinuous, leaving the pores open for passage of water vapor.

The use of metallized microporous films and membranes, such as microporous polyethylene, polypropylene, polyurethane, expanded polytetrafluoroethylene, etc. in lamination with standard textile fabrics circumvents the disadvantages of the prior art for several reasons. First, the three dimensional nature of the microporous materials provides for 100% line of sight metal coverage on the surface as viewed from above, providing the IR reflection required for adequate thermal image suppression. Second, the porosity in three dimensions required to allow large quantities of moisture vapor to permeate through the composite is preserved, thus reducing heat stress on the wearer. Third, the air entrained in the micropores of the membrane reduces the membranes thermal conductivity by providing an insulating air space. This forces more of the heat exchange between a human body and the environment to be through evaporative cooling. A large portion of the heat radiated through the microporous membrane from the body is reflected back towards the body, in turn reducing the temperature of the exterior surface, thereby reducing the thermal image. The reflected heat is removed through the body's natural cooling mechanism, evaporation. Microporous materials are also lighter, more flexible and drapeable than the materials cited in the prior art, which makes them more suitable for clothing.

The metal used in the metallized microporous films and membranes can be any metal that can be vapor deposited or sputtered on the film or membrane and produce the desired reflective effect, such as aluminum, silver, copper, zinc, or the like.

The metallization is on one side only and can be accomplished through the use of physical vapor deposition, e.g. sputtering, or chemical vapor deposition. The metal coating can range from 40 to 1200 angstroms in thickness, and the metallized membrane will have an optical density between 1 to 6 density units.

The metallized microporous film or membrane thickness measured as A in FIG. 1b can range from 0.001 to 0.125 inch and will vary depending on the desired air and moisture vapor permeability. The thickness of the metal coating is not so great as to close the pores of the microporous film or membrane, but rather deposition takes place to the extent that the surface and part of the pore walls are covered to form a line-of-sight coating, as explained further above with reference to FIG. 1.

The textile employed should have the desired specific properties, e.g., IR transparency, visible opacity, etc.

The textile is adhered to the metallized membrane on the metal coating side by laminating with a discontinuously applied adhesive with heat and pressure or by direct heat fusion.

Figure 2:
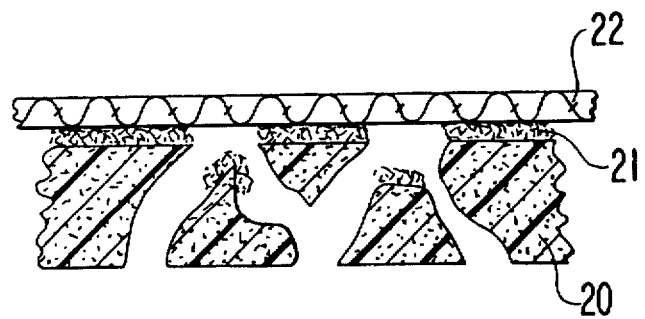
FIG. 2 is a side view of the metallized membrane laminated to a backing material.

In one embodiment shown in FIG. 2, a microporous expanded polytetrafluoroethylene (ePTFE) membrane 20 is shown with metal 21, e.g., aluminum deposited on the membrane. A textile shell material 22 such as woven silk or nylon is laminated to the coated membrane using a discontinuous polyurethane adhesive so that the metallized surface of the microporous membrane is facing the shell material. A liner fabric (not shown) such as knitted polypropylene can be attached in the same manner as the shell. Alternate embodiments could include multiple layers of metallized microporous membranes of the same or different chemistry, additional textile layers, and fusion bonding instead of adhesive bonding. In addition, the textile shell material may be coated with a topical coating of a material such as barium titanate to modify its radiant thermal characteristics.

EXAMPLE 1

A microporous ePTFE membrane 0.001 inch thick of nominal 0.2 μm pore size obtained from W. L. Gore & Associates, Inc. was metallized by vapor depositing aluminum by evaporation and condensation to an optical density of 3.0 density units (as determined on a Densitometer of Tobias Assoc., Inc. (Model TRX-N). Specifically, aluminum wire was heated in an oxide crucible at a high vacuum ($2 \times 10^{-6}$ Torr at about 1220° C. The aluminum vaporized. The ePTFE membrane with a film backing to block entry of vapor on one side was passed over the crucible with the backing on the side away from the crucible. Vapor from the cruicible rose to form the discontinuous coating on the adjacent side of the membrane. The coated membrane was then wound on a roll. After the backing was removed, the aluminized microporous membrane was laminated to a 2.7 ounce/yard woven nylon taslite shell material so that the aluminized surface is closest to the shell material, using a discontinuously applied polyurethane adhesive. A third layer of knitted nylon was then laminated to the non-metallized side of the ePTFE laminate.

To test infrared image suppression, a Hughes/Texas Instruments night vision system (dielectric volometer-Part #6245935) was used. The dielectric volometer recorded heat emission from a human object. When the laminate was placed over the object, the image of the object was substantially reduced.

EXAMPLE 2

A metallized microporous ePTFE membrane was prepared as in Example 1.

A piece of one ounce per square yard China silk was placed on a 6×9 inch rubber pad. A 6×9 inch piece of fusible open, nonwoven adhesive such as Spunfab #EV3014 was placed over the silk. A piece of the metallized film was placed over the adhesive layer with the metal side facing the adhesive. This rubber pad/silk/adhesive/metallized membrane combination was placed in a press heated to 123° C. The press was closed and pressurized to 2000 PSI for 10 seconds. The laminated samples were then removed. IR image suppression properties were determined as in Example 1. The image was substantially reduced.

I claim:

1. An infra-red reflective covering for covering objects, which comprises:
   (a) a microporous polymeric membrane that is air-permeable, moisture vapor permeable, liquid-waterproof, and drapable, in which the pores extend from one side of the membrane to the other;

(b) said membrane being laminated to a textile material;

(c) a heat-reflecting metal present as a coating on the pore walls near the surface of one side of the membrane which serves to provide the infra-red reflection;

(d) the other surface of the membrane being non-metallized.

2. The material of claim 1 wherein the membrane is microporous expanded polytetrafluoroethylene and the metal is aluminum.

3. The material of claim 2 wherein the textile material is silk.

4. The material of claim 1 the form of a garment.

5. The material of claim 1 forming a part of a garment.

6. The material of claim 1 in the form of a tenting material.

7. The material of claim 1 forming a part of a tenting material.

* * * * *